United States Patent Office 3,191,645
Patented June 29, 1965

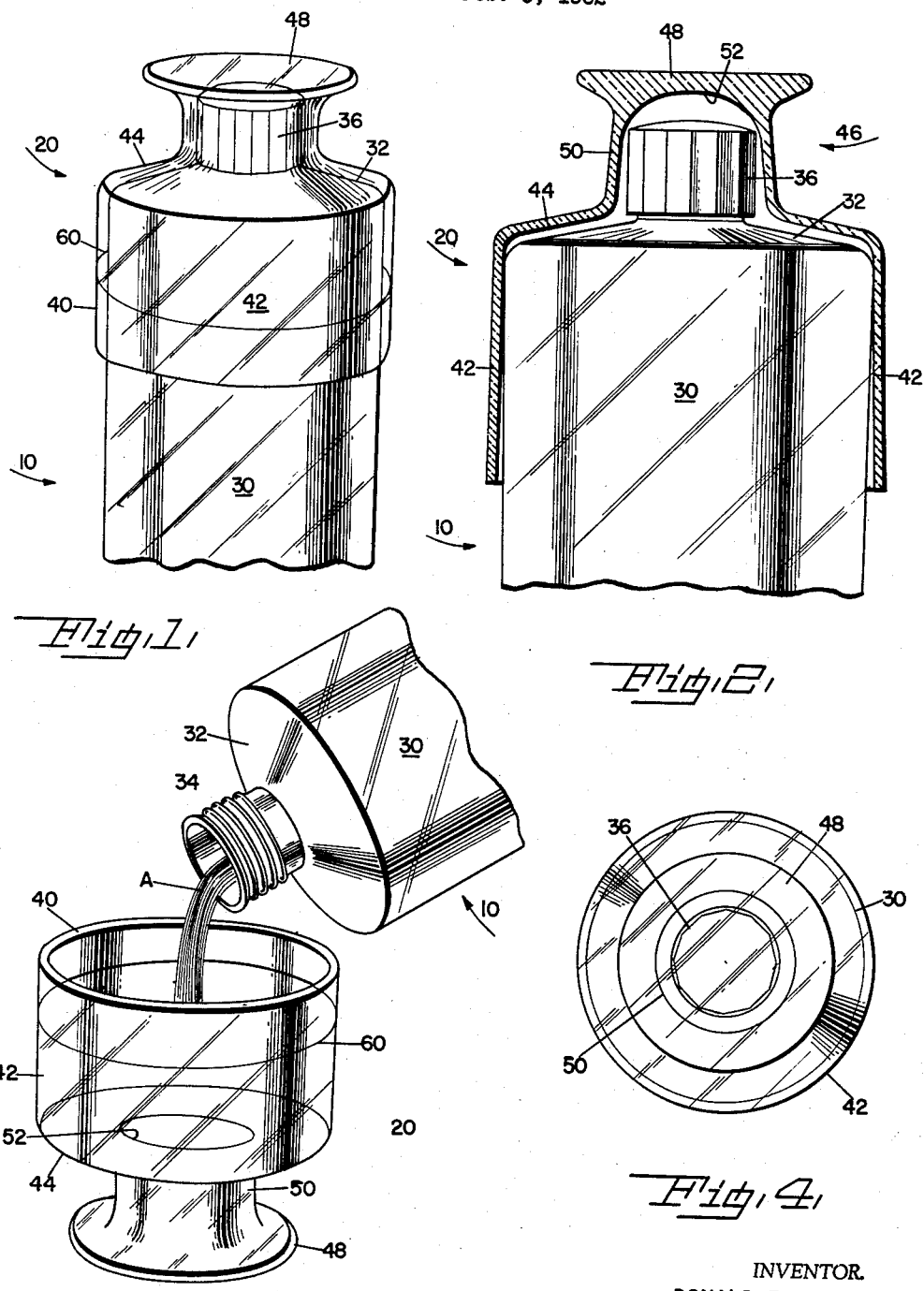

3,191,645
COMBINATION BOTTLE AND DISPENSING CUP
Donald E. Dailey, Evansville, Ind., assignor to John H. Breck, Inc., Springfield, Mass.
Filed Feb. 6, 1962, Ser. No. 171,491
2 Claims. (Cl. 141—381)

The present invention relates generally to new and useful improvements and structural refinements in containers and dispensers therefor and is directed more particularly to the provision of a combination bottle and dispensing cup, having general utility in the arts, and to an improvement in the means for embodying, in a dispensing cup, means for accurately measuring a certain amount of material added thereto from said bottle.

Without intending to place undue limitations upon the scope of the invention beyond what may be required by the state of the prior art, the particular embodiment may be briefly described as embracing the concept of a combination bottle and dispensing cup, wherein said dispensing cup may be stored or sleeved upon said bottle when not in use and wherein said dispensing cup may be utilized to determine that a certain amount has been dispensed from said bottle, when same are in use.

It is an object hereof to provide a dispenser cup which may be mated with a bottle for easy and safe shipment of the assembled unit, and wherein the said dispenser cup may be used not only to hold fluid added thereto from the bottle, but also to provide a means for determining that a certain correct amount of the fluid substance has been added thereto from the bottle.

In essence, the dispensing cup hereof, may be said to be a dispenser adapted for easy displacement of liquids therefrom, and a measure having means incorporated into its structure for determining when a certain amount of material has been added thereto.

In addition, the dispenser hereof may be readily sleeved upon, and carried with the bottle for easy and safe shipment of the pair thereof.

In practice, the bottle will contain a certain fluid substance, a certain amount of which must be mixed with a certain amount of another liquid.

Employing the novel dispenser hereof, the said certain amount of fluid substance may be added thereto in an exact amount, and the said other certain amount of liquid may be added to said fluid substance within the dispenser to provide the desired mixture, all without the need for additional measuring devices of any kind.

The characteristic features which I consider to be novel with my invention, as to its construction and organization and as to its methods of manufacture and operation, will be better understood from a consideration of the following detailed description forming a part of this specification, when read in conjunction with the illustrations in the accompanying drawing, wherein like characters of reference are employed to designate like or corresponding parts throughout the several views and in which:

FIG. 1 is a fragmentary perspective view of the combination bottle and dispensing cup of the invention;

FIG. 2 is an enlarged fragmentary elevational view with the dispensing cup being shown in section;

FIG. 3 is a fragmentary perspective view showing the manner of use of my invention; and FIG. 4 is a top plan view of the combination bottle and dispensing cup shown in FIG. 1.

In the following description and in the appended claims, various components and details thereof will be identified by specific names for purposes of convenience. Although specific terms and expressions are employed for purposes of identifying various components, they are used in a generic and descriptive sense only. The phraseology or terminology herein employed is for the purpose of limitation and they are intended to be as generic in their application as the art will permit. They are not intended to exclude any reasonable equivalents of the features shown and described or portions thereof.

With continued reference now to the drawing, which illustrates a typical and preferred embodiment of the invention for the purpose of disclosure and forms a part of this specification, I have shown a container, generally indicated by 10, having a dispensing cup, generally indicated by 20, sleeved thereon.

The container 10 will be generally cylindrical in shape and will comprise a closed bottom (not shown), an upright annular side wall 30 which tapers slightly outwardly from its lower end to its upper end where it merges with an annular tapered shoulder portion 32, which has an apertured, externally threaded neck 34 disposed centrally thereof. The neck 34 may have a cap 36 threaded thereon whereby the container may be closed or sealed when not in use.

The dispenser cup 20 will be sleeved on the upper end of the container 10 and will comprise a bowl-like body section 40 having an annular wall 42, which wall flares gradually outwardly from its lower end to its upper end to merge with an annular shoulder portion 44.

The said shoulder portion 44 will merge with an upright cup portion 46 having a generally horizontally extending top wall 48 and an annular side wall 50.

As shown in FIG. 2 the upper and innermost wall 52 of the cup portion 46 will be dish shaped and will not contact the upper end of the container cap 36.

When the dispenser 20 is sleeved upon the container 10 in the "storage" position of the two, the shoulder portion 44 of the dispenser will be contacting the shoulder portion 32 of the container to establish a firm bearing surface, this last being highly desirable during shipment of the combined unit.

The container 10 may contain a liquid substance which requires admixture with a certain quantity of another liquid prior to administration.

By means of the dispenser cup hereof, the correct amount of a liquid substance may be placed in the cup portion 46 of the dispenser, and the correct amount of the fluid to be admixed therewith may be added thereto all without the necessity for employing additional measuring devices.

In practice, the container and dispensing cup will be utilized as illustrated in FIG. 3.

The fluid substance A to be measured, and contained within the container 10, will be poured into the cup portion 46 of the dispenser 20 to the level of the shoulder portion 44.

The cup portion 46 will be of appropriate size to hold a predetermined amount of said fluid substance.

Following the addition of the fluid substance A, an admixture of water (not shown) or other liquor may be added to the dispenser to obtain the desired mixture.

A sight line 60 may be etched or otherwise engraved on the side wall 42 of the dispenser to insure that the proper amount of liquid is added.

By reason of the dish shape of the innermost wall 52 of cup portion 46, and further because of the gentle curve at the junction of the side wall 42 and the shoulder 44 of the dispenser, a turbulence is set up when the added liquor contacts the fluid substance A in the cup portion 46, wherefore eddies are set up to insure a proper mixture of the substances.

In actuality, there is provided herewith, not only a convenient dispenser for a fluid substance, but also an accurate measuring device therefor, which device insures that the fluid substance will be admixed properly to produce a desired mixture having the desired proportions of fluid substance and mixing liquor.

From the foregoing, it is obvious that I have provided a truly novel bottle and dispenser cup therefor.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

I claim:

1. In combination, a cylindrical bottle having tapered side walls and a threaded neck extending outwardly from an annular shoulder portion at the upper reaches of said side walls, said threaded neck having a cap threaded thereon, a dispenser sleeved upon said bottle and having an annular body portion embracing the side walls of said bottle and having a shoulder portion resting upon the shoulder portion of said bottle, and having an upright cup portion integral therewith extending outwardly therefrom and adapted to encompass said cap and said threaded neck, said cup portion being of a certain size to receive and measure a predetermined amount of substance placed therein from said bottle.

2. In the combination bottle and dispenser of claim 1 wherein said cup portion includes an uppermost and innermost wall of dish shape spaced outwardly from said threaded neck of the bottle.

References Cited by the Examiner
UNITED STATES PATENTS

| | | | |
|---|---|---|---|
| 1,039,843 | 10/12 | Syracuse | 220—23.83 XR |
| 1,280,700 | 10/18 | Fouche | 141—381 |
| 2,185,699 | 1/40 | Zeugner | 141—381 |
| 2,595,113 | 4/52 | Taberer | 215—6 XR |
| 2,804,103 | 8/57 | Wall | 141—381 |
| 2,840,124 | 6/58 | Greene | 141—381 |

LAVERNE D. GEIGER, *Primary Examiner.*

RAPHAEL M. LUPO, *Examiner.*